US012460479B2

(12) United States Patent

Miner et al.

(10) Patent No.: US 12,460,479 B2
(45) Date of Patent: Nov. 4, 2025

(54) TOP CAP AND ACCESSORY TRAY FOR LADDERS AND LADDERS INCORPORATING SAME

(71) Applicant: LITTLE GIANT LADDER SYSTEMS, LLC, Springville, UT (US)

(72) Inventors: Steven S. Miner, Springville, UT (US); N. Ryan Moss, Mapleton, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 1046 days.

(21) Appl. No.: 17/495,374

(22) Filed: Oct. 6, 2021

(65) Prior Publication Data

US 2022/0106836 A1 Apr. 7, 2022

Related U.S. Application Data

(60) Provisional application No. 63/088,239, filed on Oct. 6, 2020.

(51) Int. Cl.

| | |
|---|---|
| ***E06C 7/14*** | (2006.01) |
| ***E06C 1/16*** | (2006.01) |
| ***E06C 1/393*** | (2006.01) |
| ***E06C 7/16*** | (2006.01) |

(52) U.S. Cl.

CPC .................. *E06C 7/14* (2013.01); *E06C 1/16* (2013.01); *E06C 1/393* (2013.01); *E06C 7/16* (2013.01)

(58) Field of Classification Search

CPC ... E06C 7/14; E06C 1/16; E06C 1/393; E06C 7/16; E06C 1/08

See application file for complete search history.

(56) References Cited

U.S. PATENT DOCUMENTS

| | | |
|---|---|---|
| 4,040,549 A | 8/1977 | Sadler |
| 5,622,278 A | 4/1997 | Fries et al. |
| 5,722,507 A | 3/1998 | Kain |

(Continued)

FOREIGN PATENT DOCUMENTS

| | | |
|---|---|---|
| CN | 1339648 A | 3/2002 |
| CN | 201729096 U | 2/2011 |

(Continued)

OTHER PUBLICATIONS

International Search Report and Written Opinion for PCT Application No. PCT/US2023/082191, dated Mar. 15, 2024.

(Continued)

*Primary Examiner* — Amy J. Sterling

(74) *Attorney, Agent, or Firm* — Dorsey & Whitney LLP

(57) ABSTRACT

Embodiments of ladders, top caps and ladder accessories are provided herein. In accordance with one embodiment, a ladder includes a first pair of spaced apart rails having one or more rungs extending between and coupled with the first pair of spaced apart rails. The ladder further includes a second pair of spaced apart rails. A top cap is coupled with either the first pair of spaced apart rails or the second pair of spaced apart rails. The top cap includes one or more retaining members that may include a lateral groove (e.g., a sidewall and a lip or abutment shoulder associated therewith) configured to hold a container such as a paint can. The retaining structure may be configured to hold the container in place even if the ladder is inadvertently tipped or jarred to the side.

27 Claims, 12 Drawing Sheets

(56) References Cited

U.S. PATENT DOCUMENTS

| | | | | | |
|---|---|---|---|---|---|
| 5,740,883 | A | | 4/1998 | Trank | |
| D597,685 | S | * | 8/2009 | Gibson | E06C 7/14 D25/68 |
| D627,487 | S | * | 11/2010 | Lopez | D25/68 |
| 9,422,767 | B2 | | 8/2016 | Russell et al. | |
| 2002/0017430 | A1 | | 2/2002 | Rosko | |
| 2005/0274575 | A1 | | 12/2005 | Gibson | |
| 2009/0078504 | A1 | | 3/2009 | Astor | |
| 2018/0187488 | A1 | | 7/2018 | Mora et al. | |
| 2018/0298691 | A1 | | 10/2018 | Cook et al. | |
| 2019/0264505 | A1 | * | 8/2019 | Dangrow | E06C 7/48 |
| 2019/0376341 | A1 | | 12/2019 | Maxfield et al. | |
| 2020/0254605 | A1 | | 8/2020 | McGee | |
| 2020/0386050 | A1 | | 12/2020 | Mittanck et al. | |
| 2022/0145700 | A1 | * | 5/2022 | Major | E06C 7/14 |

FOREIGN PATENT DOCUMENTS

| | | | |
|---|---|---|---|
| CN | 205044603 | U | 2/2016 |
| CN | 108349552 | A | 7/2018 |
| CN | 209976451 | U | 1/2020 |
| CN | 210174700 | U | 3/2020 |
| KR | 200146389 | Y1 | 6/1999 |

OTHER PUBLICATIONS

International Search Report and Written Opinion of PCT Application No. PCT/US2021/053784 dated Jan. 21, 2022.

Search Report and First Office Action in China Patent Application No. 202180074828.X,.

* cited by examiner

TOP CAP AND ACCESSORY TRAY FOR LADDERS AND LADDERS INCORPORATING SAME

RELATED APPLICATION

This application claims the benefit of U.S. Provisional Application No. 63/088,239, filed on 6 Oct. 2020, which is hereby incorporated by reference herein in its entirety.

BACKGROUND

The present disclosure relates generally to ladders and, more particularly, to top caps, accessory trays or attachments, and ladders incorporating the same.

Ladders are conventionally utilized to provide a user thereof with improved access to elevated locations that might otherwise be inaccessible. Ladders come in many shapes and sizes, such as straight ladders, straight extension ladders, step ladders, and combination step and extension ladders. So-called combination ladders may incorporate, in a single ladder, many of the benefits of multiple ladder designs.

Ladders known as step ladders are self-supporting, meaning that they do not need to be leaned against a wall, pole or other structure for stability. Rather, step ladders may be positioned on a floor (or other similar surface) such that at least three, and conventionally four, feet of the ladder provide a stable support structure for a user to climb upon, even in an open space (e.g., outside or in the middle of a room) without a wall, roof, pole or other type of structure being necessary for the stability of the ladder.

Often it is desirable for a user to handle various items while standing on a ladder, including tools (e.g., screwdrivers, putty knives, paint brushes, hammers, wrenches, power tools, etc.) and supplies (nails, screws, paint, etc.). The ability to keep tools and supplies with a person while on a ladder, such that they don't have to continue ascending and descending a ladder in order to change tools or get new supplies, enables a user to save time and effort and also provides a safer experience for the user.

It is a continued desire within the industry to provide ladders and ladder components that are safe, efficient and effective tools for a user thereof. Many efforts have been and continue to be expended in an effort to improve the performance of ladders, improve the associated manufacturing processes and to provide the end user with a good experience when using ladders.

SUMMARY

Embodiments of the present disclosure include ladders, top caps and ladder accessories. In one embodiment, a stepladder may include a first pair of spaced apart rails, at least one rung extending between and coupled with the first pair of spaced apart rails, a second pair of spaced apart rails and a top cap with at least one of the first pair of spaced apart rails, and the second pair of spaced apart rails. The top cap includes a retaining structure, the retaining structure including a first sidewall extending from a floor portion and a first lip adjacent the first sidewall.

In one embodiment, the retaining structure includes a second sidewall extending from the floor portion and a second lip adjacent the second sidewall.

In one embodiment, the first sidewall is spaced from the second sidewall to define an angle between approximately 8 degrees and approximately 12 degrees.

In one embodiment, the first sidewall is spaced from the second sidewall to define an angle of approximately 10 degrees.

In one embodiment, the first sidewall and the second sidewall are spaced to receive a cylindrical canister therebetween.

In one embodiment, the first sidewall and the second sidewall are spaced to receive a cylindrical canister having a volume of approximately one gallon.

In one embodiment, the first sidewall includes a first section and a second section, the first section and the second section being joined by an arcuate section.

In one embodiment, the first lip is positioned adjacent the first section and wherein a second lip is positioned adjacent the second section.

In one embodiment, the top cap of the ladder further comprises a second retaining structure including a second sidewall extending from a second floor portion and a second lip adjacent the second sidewall.

In one embodiment, the top cap of the ladder further comprises a third retaining structure including a third sidewall extending from a third floor portion and a third lip adjacent the third sidewall.

In one embodiment, the first retaining structure is sized and configured to retain a substantially cylindrical canister having a volume of approximately one gallon; the second retaining structure is sized and configured to retain a substantially cylindrical canister having a volume of approximately one quart; and the third retaining structure is sized and configured to retain a substantially cylindrical canister having a volume of approximately one pint.

In one embodiment, wherein the top cap includes at least one storage compartment. The first sidewall can include a first portion and a second portion, wherein the first portion is substantially straight and the second portion is curved or angled relative to the first portion.

In one embodiment, wherein the top cap includes at least one opening formed in a front face of the top cap.

In one embodiment, further comprising a pair of hinges coupled the second pair of spaced apart rails with the first pair of spaced apart rails.

In one embodiment, wherein the top cap does not contact the second pair of spaced part rails.

In accordance with another embodiment of the present disclosure, a top cap for a ladder is provided. The top cap comprises a body being sized and configured for coupled with a pair of spaced apart rails and a retaining structure formed in the body, the retaining structure including a first sidewall extending from a floor portion and a first lip adjacent the first sidewall, the first sidewall and the first lip defining a lateral groove.

In one embodiment, the body is further sized and configured for coupling with an adjustable tray.

In one embodiment, the retaining structure includes a second sidewall extending from the floor portion and a second lip adjacent the second sidewall.

In one embodiment, the first sidewall is spaced from the second sidewall to define an angle between approximately 8 degrees and approximately 12 degrees.

In one embodiment, the first sidewall is spaced from the second sidewall to define an angle of approximately 10 degrees.

In one embodiment, the first sidewall includes a first section and a second section, the first section and the second section being joined by an arcuate section.

In one embodiment, wherein the first lip is positioned adjacent the first section and wherein a second lip is positioned adjacent the second section.

In one embodiment, the top cap further comprises a second retaining structure including a second sidewall extending from a second floor portion and a second lip adjacent the second sidewall.

In one embodiment, the top cap further comprises a third retaining structure including a third sidewall extending from a third floor portion and a third lip adjacent the third sidewall.

In one embodiment, the first retaining structure is sized and configured to retain a substantially cylindrical canister having a volume of approximately one gallon; the second retaining structure is sized and configured to retain a substantially cylindrical canister having a volume of approximately one quart; and the third retaining structure is sized and configured to retain a substantially cylindrical canister having a volume of approximately one pint.

In one embodiment, the top cap includes at least one storage compartment.

In one embodiment, the top cap includes at least one opening formed in a front face of the top cap. The top cap can include a second retaining structure including a second sidewall extending downward from the floor portion, the second sidewall including a second shoulder extending horizontally from the second sidewall.

It is noted that aspects, features and components of one described embodiment may be combined with aspects, features or components of other defined embodiments herein.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
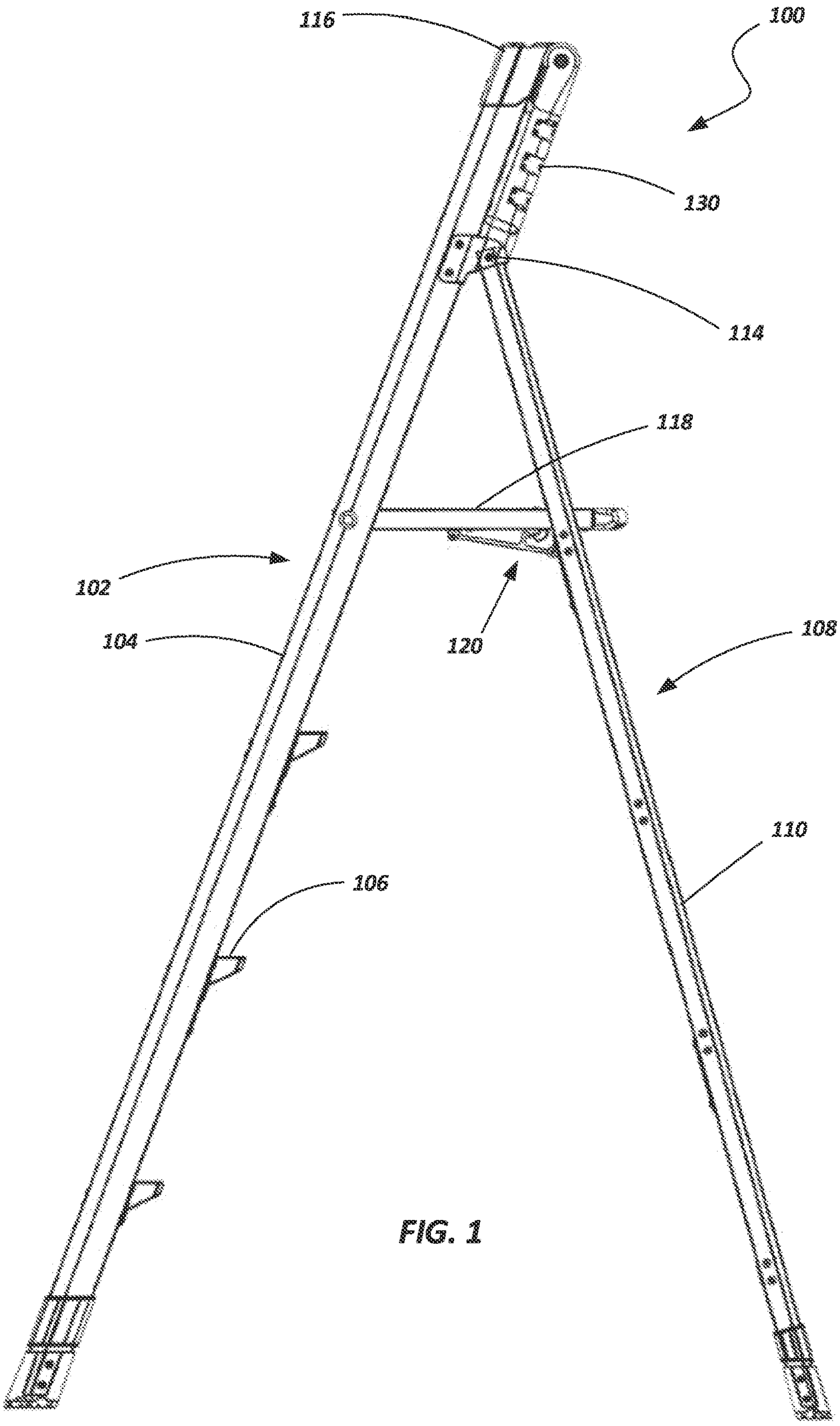
FIG. 1 is a side view of a step ladder according to an embodiment of the present disclosure.
Figure 2:
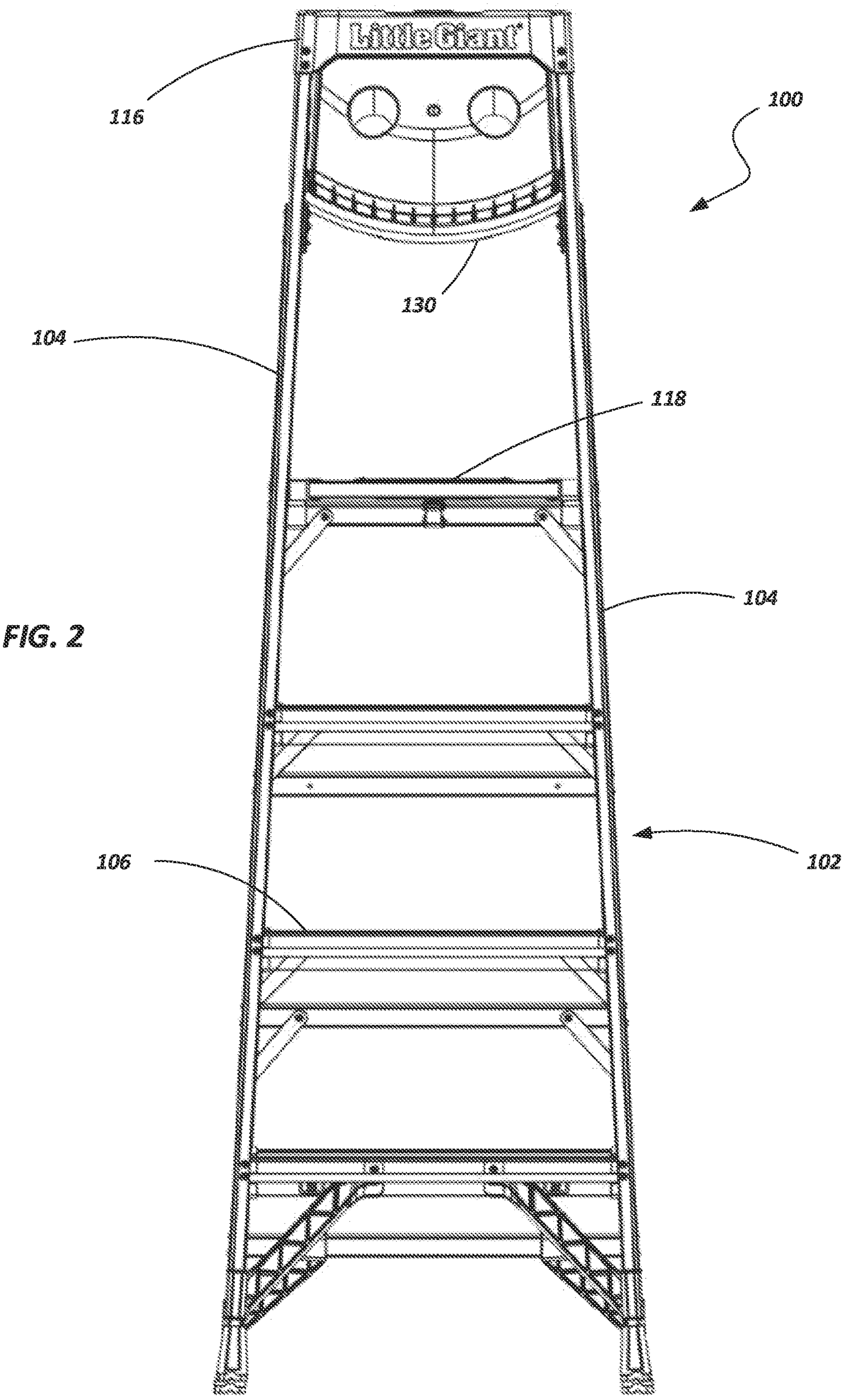
FIG. 2 is a front view of the step ladder shown in FIG. 1.
Figure 3:
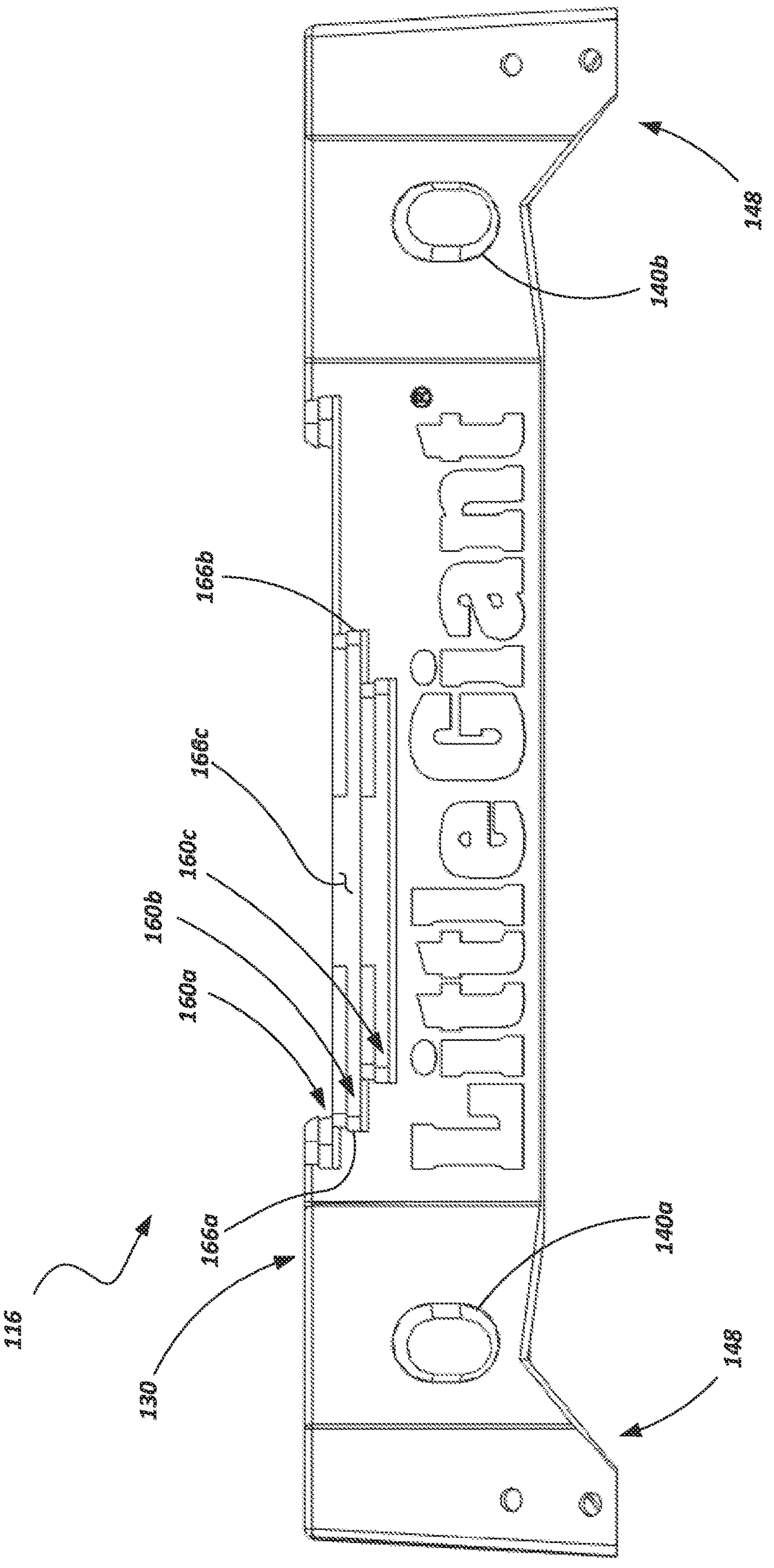
FIG. 3 is a front view of a top cap that may be used with the ladder shown in FIG. 1.

Referring to FIGS. 1 and 2, a ladder 100 is shown in accordance with an embodiment of the present invention. The ladder 100 shown in FIG. 1 is configured generally as a platform type step ladder and includes a first assembly 102 having a pair of spaced apart rails 104 and a plurality of rungs 106 extending between, and coupled to, the rails 104 (e.g., by mechanical fastener, adhesive or material joining techniques). The rungs 106 are substantially evenly spaced, parallel to one another, and are configured to be substantially level when the ladder 100 is in an orientation for intended use, so that they may be used as "steps" to support a user as they ascend the ladder 100 and as will be appreciated by those of ordinary skill in the art. In various embodiments, the upper surface of the rungs 106 may include traction features (e.g., grooves and ridges, grip tape, rubberized coverings or other anti-slip features) to provide traction to a user while standing on the rungs 106.

The ladder 100 also includes a second assembly 108 having a pair of spaced apart rails 110. The second assembly 108 may also include cross-members or other structural components that extend between the rails 110 to provide a desired level of structural support and strength to the spaced apart rails 110. In some embodiments, the cross-members of the second assembly 108 may be configured as rungs to support a user. The second assembly 108, thus, may be used to help support the ladder 100 when in an intended operational state, such as depicted generally in FIG. 1.

In the embodiment shown in FIG. 1, hinged or pivoting connections 114 (also referred to as hinges) couple the first rail assembly 102 and the second rail assembly 108 together such that the two assemblies 102 and 108 may be folded or collapsed into a stored or stowed state. When in a stowed state, the first rail assembly 102 and the second rail assembly 108 are positioned adjacent each other in a relatively thin profile, such as will be appreciated by those of ordinary skill in the art.

It is noted that in the embodiment shown in FIGS. 1 and 2, the rails 104 of the first assembly 102 extend substantially beyond the hinged connections 114 and are coupled with a top cap 116. In such an embodiment, the extended rails 104 and the top cap 116 may be used as a storage tray for tools, supplies or other materials as will be discussed in further detail below. Additionally, the top cap 116 may be used as a handrail to help support or balance a user when they are standing on the ladder 100. It is noted, however, the various features and aspects of the present invention are applicable to, and contemplated as being incorporated with, other types of ladders including, for example, step ladders having a conventional top cap that is directly coupled to both of the first and second assemblies (e.g., at least one of the first and second assemblies being pivotally coupled with the top cap), as well as with extension ladders, straight ladders, combination ladders or other types of ladders. Some nonlimiting examples of step ladders and related components that may be utilized in accordance with embodiments of the present invention include those described by U.S. Patent Publication No. US2018/0298691, published Oct. 18, 2018, and U.S. Pat. No. 9,422,767 issued on Aug. 23, 2106, the disclosures of which are incorporated by reference herein in their entireties.

In the embodiment shown in FIGS. 1 and 2, a platform 118 is positioned above the rungs 106 and extends from the rails 104 of the first assembly 102 to the rails 110 of the second assembly 108. The platform 118 may be configured to support all, or at least a substantial portion, of a user's feet, thereby providing a comfortable and safe working surface to the user. In the presently described embodiment, the platform 118 is hingedly coupled to the rails 104 of the first assembly 102 and engages a cross-member associated with the second assembly 108. In one embodiment, the platform 118 may simply rest on the associated cross-member. In another embodiment, a locking member may be used to selectively couple the platform 118 and the associated cross-member in a deployed state or position. In some embodiments, an actuatable latch member 120 may be used to selectively lock (and release) the platform 118 relative to the second assembly 108 in the position shown in FIG. 1.

The first and second assemblies 102 and 108 may be formed of a variety of materials and using a variety of manufacturing techniques. For example, in one embodiment, the rails 104 and 110 may be formed of a composite material, such as fiberglass, while the rungs and other structural components may be formed of aluminum or an aluminum alloy. In other embodiments, substantially all of the components of the assemblies may be formed of aluminum or an aluminum alloy. In other embodiments, the assemblies 102 and 108 (and their various components) may be formed of other materials including other composites, plastics, polymers, various metals and metal alloys.

The ladder 100 may also include various bracing, structural reinforcement members and other components such as described in the previously incorporated U.S. Patent Publication No. US2018/0298691 and U.S. Pat. No. 9,422,767.

The ladder 100 may further include an accessory, which may also be referred as a tray 122, coupled with top cap 116. In some embodiments, the tray 122 may be coupled to the rails 104 of the first assembly 102 at a location between the hinges 114 and the top cap 116. The tray 122 may be selectively positioned and maintained in a variety of positions including, for example, a first position wherein the tray 122 extends upward from the top cap 116, a second position wherein the tray 122 extends laterally outward (generally horizontally) from the top cap 116, and a third position wherein the tray 122 extends downward from the top cap 116 (e.g., as shown in FIG. 1), such that it is positioned immediately adjacent (and can even abut) the upper portions of the rails 104 of the first assembly 102 above the hinges 114. A non-limiting example of such an accessory is described in further detail in U.S. patent application Ser. No. 16/891,937, filed on Jun. 3, 2020, the disclosure of which is incorporated by reference herein in its entirety.

Referring now to FIGS. 3-11, a top cap is shown in accordance with an embodiment of the present disclosure. The top cap 116 may be formed generally as a body 130 configured for connection to the rails of one or more assemblies of a ladder (e.g., rails 104 of ladder 100 shown in FIGS. 1 and 2) and include a variety of features as will be discussed herein. For example, the body 130 may include or define various openings or through-holes. In some embodiments, these may include one or more elongated openings or through-holes 132*a* and 132*b* which may be configured to receive a portion of tool such as the blade of a putty knife or scraper. These openings 132*a* and 132*b* may be large enough to receive one portion of the tool (e.g., a blade) while impeding passage of another portion of the tool (e.g., a handle attached to a blade). Thus, a user of the ladder 100 may store such tools at the top of the ladder, where they will want to access them periodically while working on a particular project. In one embodiment, these elongated through openings may be positioned at the lateral edges of the top cap 116, near where the top cap joins with the rails of a ladder.

The body 130 of the top cap 116 may include or define a variety of other openings of through-holes, such as through-hole 134, through-holes 136*a* and 136*b*, through-holes 138*a*-138*c*, and through-holes 140*a* and 140*b*. In some embodiments, these through-holes may be used to hold or store various tools (e.g., screw drivers, hammers, wrenches, paint brushes, etc.). In some examples, some of the through-holes (e.g., through-holes 140*a* and 140*b* located in the front face of the body 130) may be configured to receive a clip or a carabiner to clip other tools or supplies to the top cap 116 for storage. Another through-hole 142 may be sized to receive larger items for storage, including for example, the chuck end of a power drill. In some embodiments, one or more through-holes 144 may have an open (i.e., non-closed) periphery, enabling the receipt of enlarged member (e.g., a knot formed in a cord, a ball or knob attached to a portion of a cord) coupled with some other object. For example a looped bungee cord may be attached to a tool, and a ball or knob attached to the bungee cord may be retained in the open-sided through hole 144—holding the tool (or other object) from the top cap 116.

In addition to the openings or through-holes, one or more closed-bottomed compartments or recesses 146*a* and 146*b* may be formed in the body 130 of the top cap 116 to store various items (e.g., screws, nails, other tools or devices, etc.). A storage compartment 146*a* can be positioned between sidewalls (e.g., 162*a*) of at least one of the retaining structures (e.g., 160*a*). In some embodiments, one or more retaining structures (e.g., 160*b*, 160*c*) can be positioned between the sidewalls (e.g., 162*a*) of a retaining structure (e.g., 160*a*). Additionally, the additional retaining structures (e.g., 160*b*, 160*c*) can be positioned offset from a centerline of the first retaining structure, or, in other words, the additional retaining structures can have centerlines between their sidewalls (e.g., each pair of sidewalls 162*b* and 162*c*) that are spaced apart from a centerline between the sidewalls (e.g., 162*a*) of the first retaining structure, as shown in at least FIG. 7. By being positioned offset from the centerline of the larger retaining structure (e.g., 160*a*) and asymmetrically away from the centerline of the top cap as a whole, the space within the larger retaining structure can serve multiple purposes, such as by containing the additional, smaller, nested retaining structures and at least one recess, compartment, or through-hole (e.g., 146*a*) that is not within one of the smaller retaining structures. Thus, a user can simultaneously retain a smaller container within a smaller retaining structure and can use the compartment 146*a* when a larger container (e.g., retained by the larger retaining structure 160*a*) is not used.

Other features of the body 130 may include portions for connection to rails (e.g., portions 148) and portions for connecting to the accessory tray 122 (e.g., portions 150). In some embodiments, it is noted that the top cap 116 may not be configured for mounting with an accessory tray 122. Such a coupling of the top cap 116 with an accessory tray 122 is described in U.S. patent application Ser. No. 16/891,937, previously incorporated by reference. In some embodiments, the top cap 116 may be configured to be coupled with rails from both front and rear rail assemblies and, further, may be configured to be pivotally coupled to some of the rails.

Additionally features of the top cap 116 may include retaining structures configured, for example, to couple a paint can or similar structure with the top cap 116. Such feature may be configured to keep a paint can from tipping over or spilling while positioned at the top of the ladders. For example, the retaining features may include one or more grooves and shoulders formed in a sidewall portion of the body 130.

In the embodiment depicted in FIGS. 3-11, three separate retaining structures 160*a*, 160*b* and 160*c*, are provided with each being configured to hold or retain a different size canister or container. Each of the retaining structures 160*a*, 160*b* and 160*c* may include one or more sidewalls 162*a*, 162*b* and 162*c*, and the sidewalls may each having an associated lip or shoulder 164*a*, 164*b* and 164*c* positioned at the upper end of the sidewall ("upper" being a relative term when considering the top cap 116 in an orientation of intended use—such as depicted in FIGS. 1-2). Considering the second retaining structure 160*b* as an example, the sidewall 162*b* may include a first segment and a second segment that extend upward from a floor region 165 and be oriented at a defined angle β relative to each other. For example, a first substantially linear segment 166*a* and a second substantially linear segment 166*b* may extend at an angle of approximately 10 degrees. In other embodiments, these two segments may extend to form an angle of approximately 9 degrees to approximately 11 degrees. In yet another embodiment, the two segments may form an angle of approximately 8 degrees to approximately 12 degrees. A third sidewall segment 166*c* may extend between and connect the first two segments 166*a* and 166*b*. In one embodiment, the third segment 166*c* may include an arcuate segment (e.g., a semi-circle) and the three segments 166*a-c* may be configured to provide a substantially continuous sidewall. In other embodiments, the retaining structure may include two separate sidewalls with associated lips or abutment shoulders such as shown with respect to the first retaining structure 160*a* (e.g., the arcuate segment is not present in the first retaining structure 160*a* in the embodiment depicted in FIGS. 3-11). The two walls may be positioned relative to each other at an angle β such as described above.

Figure 5:
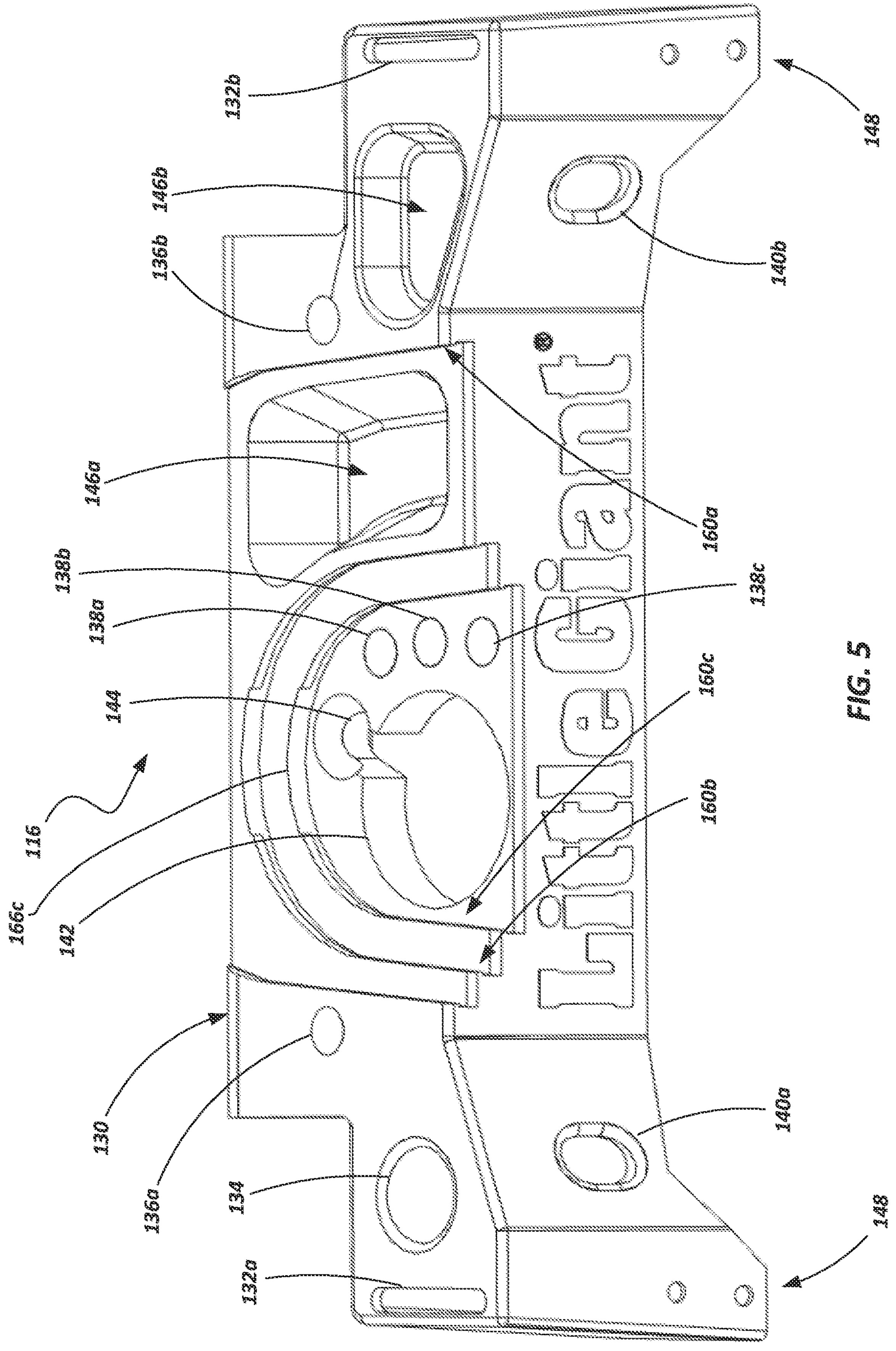
FIG. 5 is a top-front perspective view of the top cap shown in FIG. 3.
Figure 6:
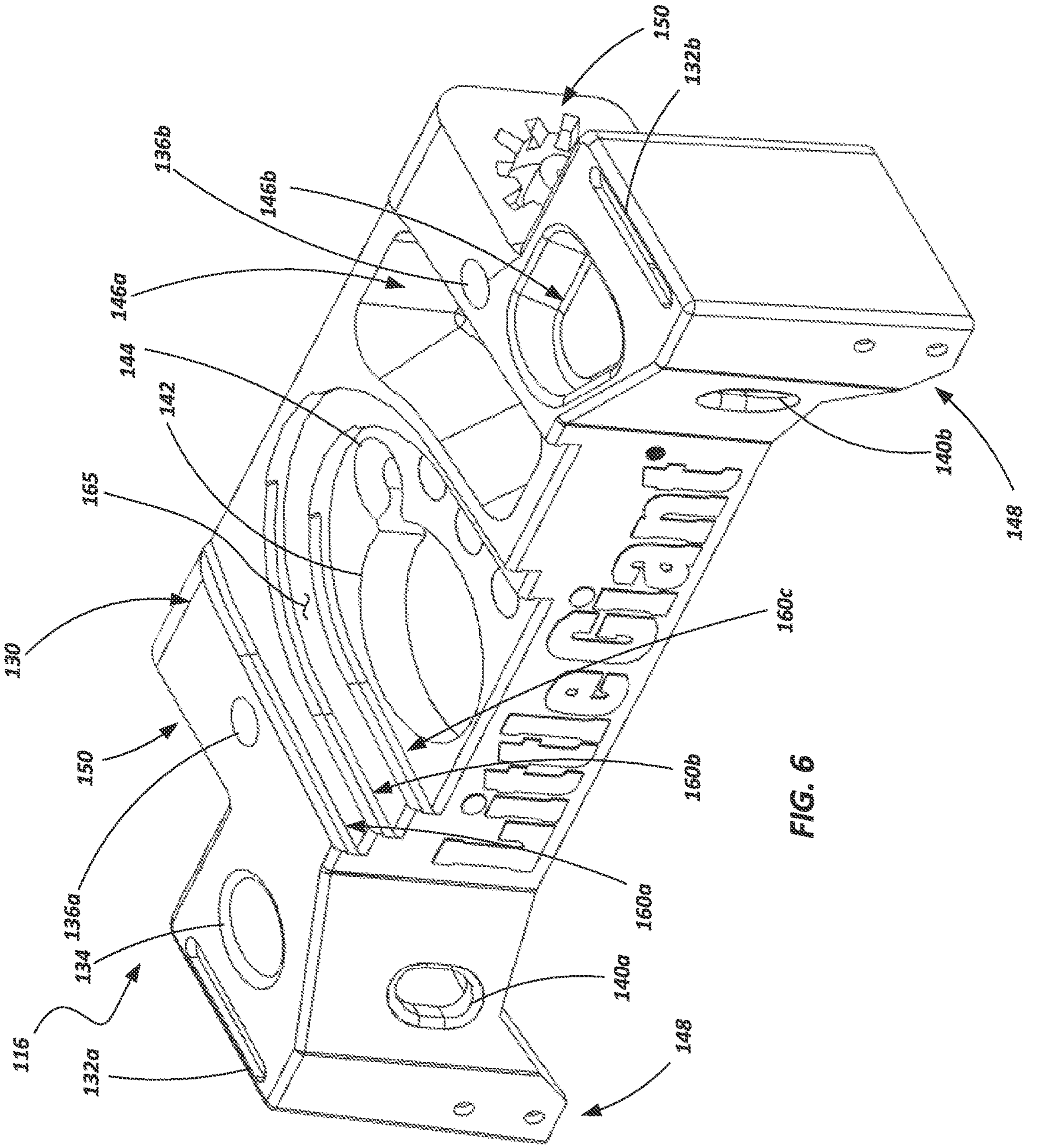
FIG. 6 is a perspective view of the top cap shown in FIG. 3.

In some embodiments, the lip or shoulder 164*b* may be positioned above the entirety of the sidewall 162*b* (i.e., extending along the entire length of each segment 166*a-c*). In other embodiments, the lip or shoulder 164*b* may be positioned over a portion of one or more segments. In some embodiments, a lip or shoulder is a structure extending normal to another surface (e.g., a sidewall). The lip or shoulder can also be defined as a portion of material extending in a cantilever fashion from another surface or extending laterally over a substantially vertical sidewall surface. For example, as shown in FIGS. 5 and 6, the shoulder 164*b* may include a first segment or portion that extends along the length of the first sidewall segment 166*a* and extends partially along the third segment. The shoulder 164*b* may include a second segment or portion that extends along the length of the second sidewall segment 166*b* and partially into the third sidewall segment 166*c*. A portion of the third sidewall segment 166*c* does not have any lip or shoulder portion along its upper edge. In some embodiments, the shoulder 164*b* can extend only partially along the length of the first sidewall segment 166*a* and/or only partially along the length of the second sidewall segment 166*b*. For instance, a portion of one or both of the sidewalls segments 166*a*, 166*b* can have no lip or shoulder portion along its upper edge near the front of the top cap instead of extending completely to the front edge in the manner shown in FIGS. 5 and 6. This limited shoulder length can make it easier to insert a container into the retaining structures 160 by allowing vertical insertion at the front of the top cap followed by horizontal insertion underneath the shoulder 164*b*. In some embodiments, the other retaining structures 160*a* and 160*c* may be configured generally similar to that of retaining structure 160*b*. For example, each of the retaining structures 160*a* and 160*c* include sidewalls having segments extending out at an angle relative to each other (e.g., at substantially the same angle as that of retaining structure 160*a*). For retaining structure 160*a*, the two sidewall segments are not connected by a third segment to provide a single continuous sidewall. However, each sidewall segment may include a linear portion and an arcuate portion such as depicted in the drawings.

Figure 4:
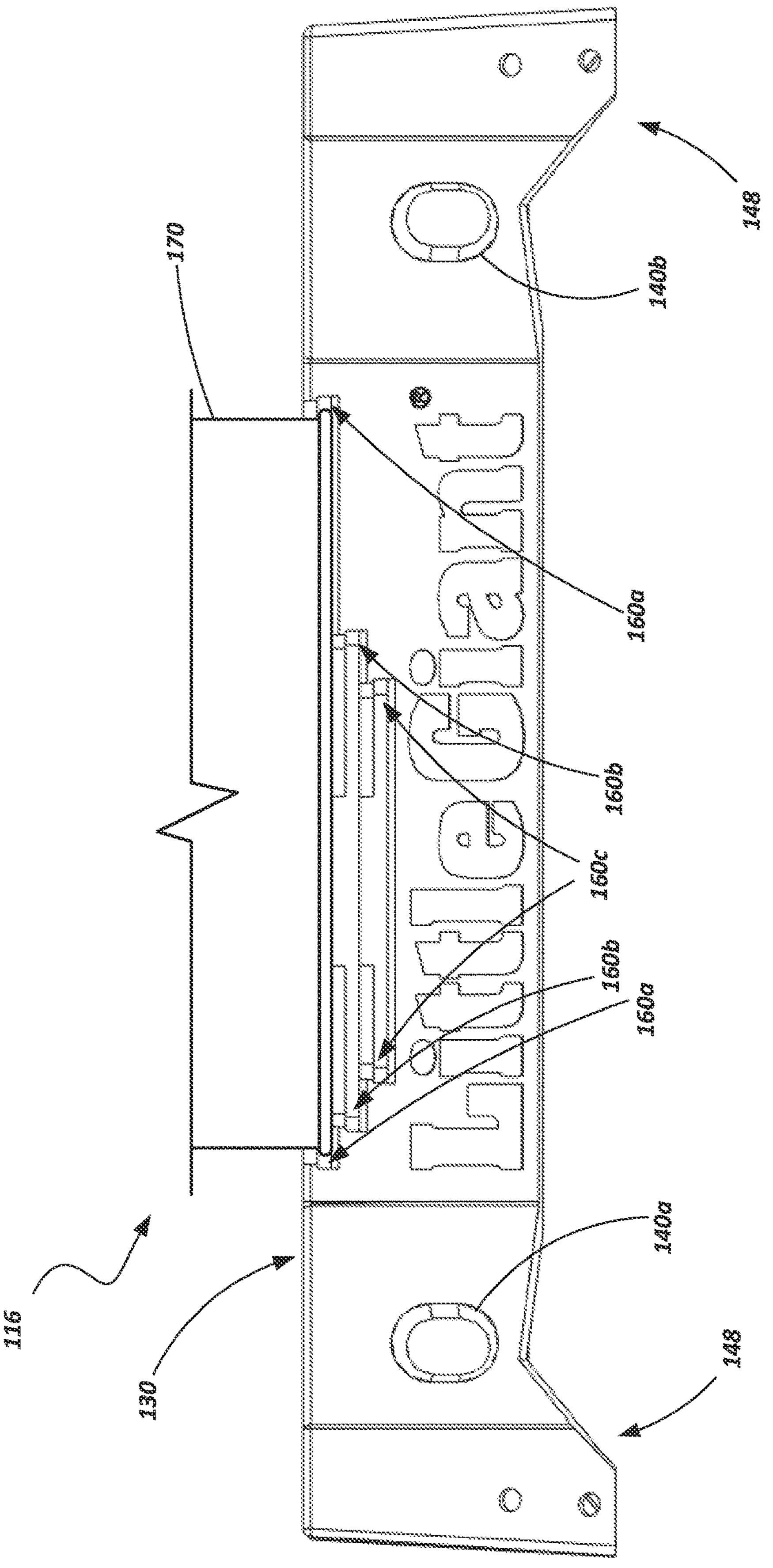
FIG. 4 is a front view of the top cap shown in FIG. 3 with a canister coupled with the top cap.
Figure 7:
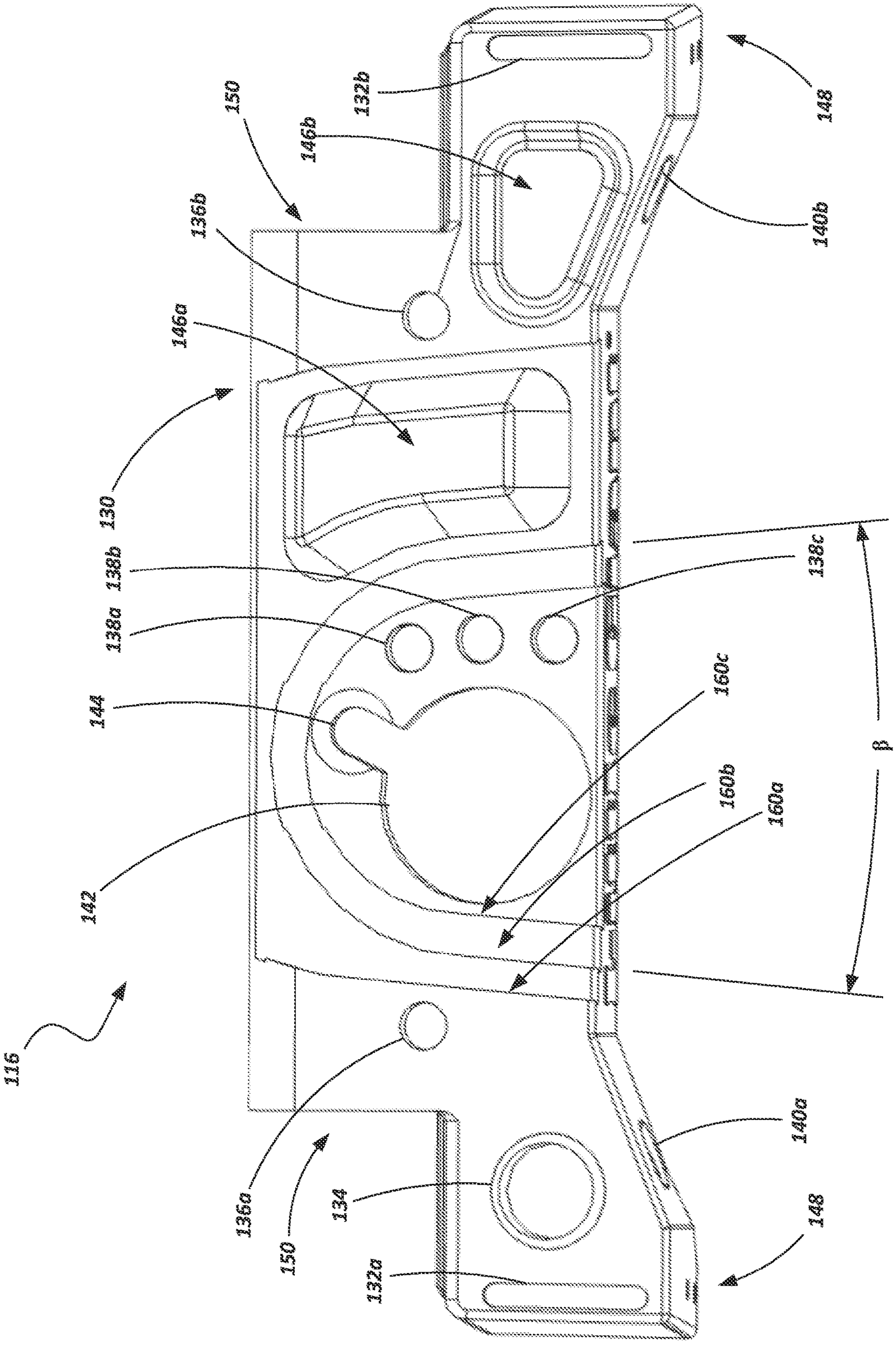
FIG. 7 is a top view of the top cap shown in FIG. 3.
Figure 8:
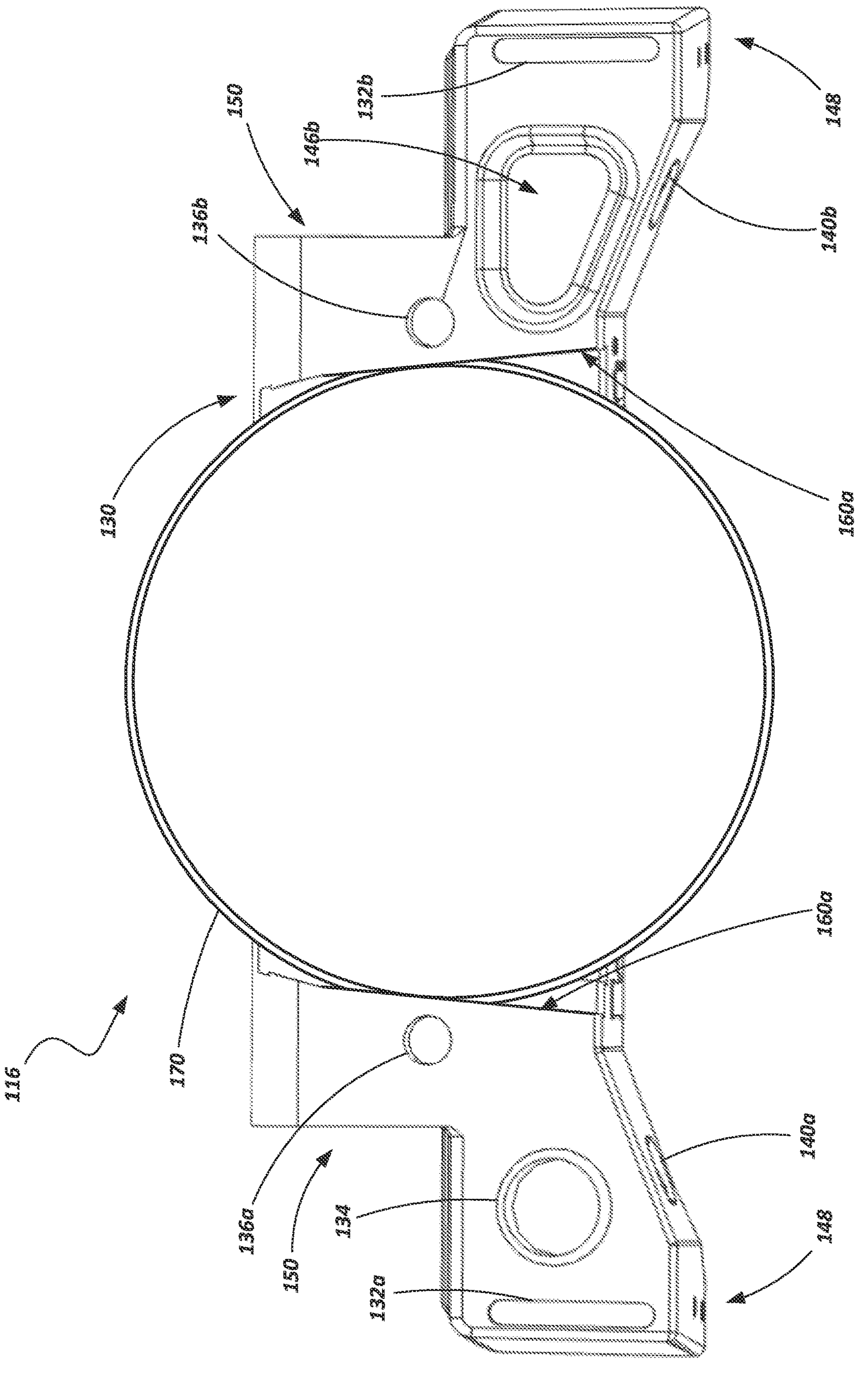
FIG. 8 is a top view of the top cap shown in FIG. 3 with a canister coupled with the top cap.
Figure 9:
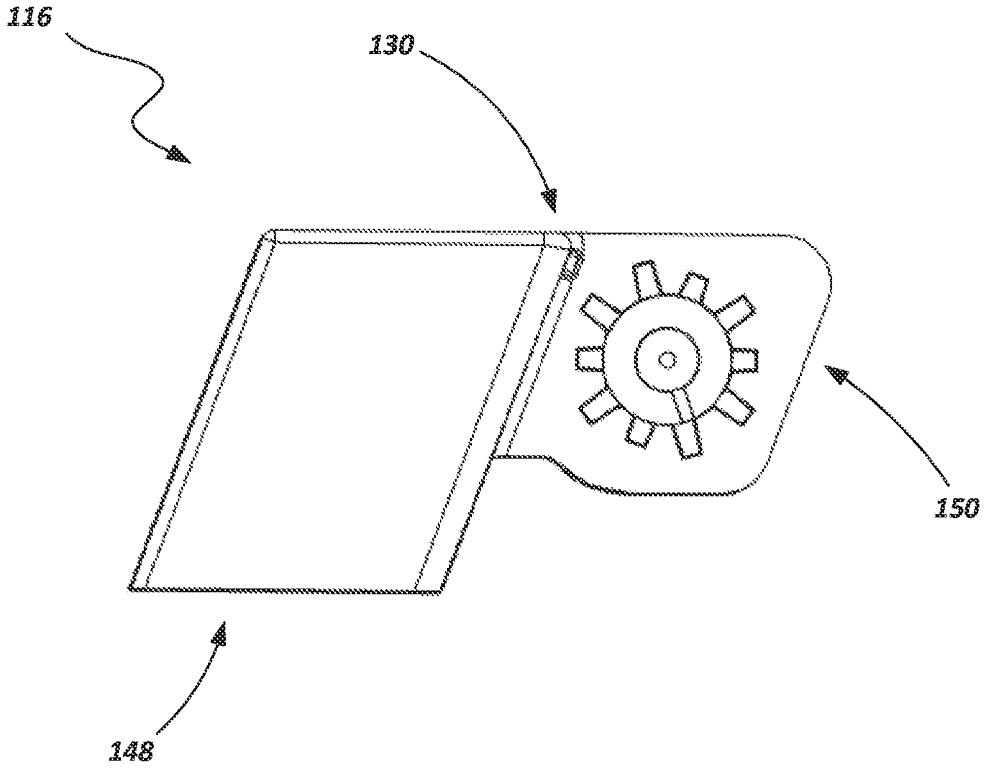
FIG. 9 is a side view of the top cap shown in FIG. 3.
Figure 10:
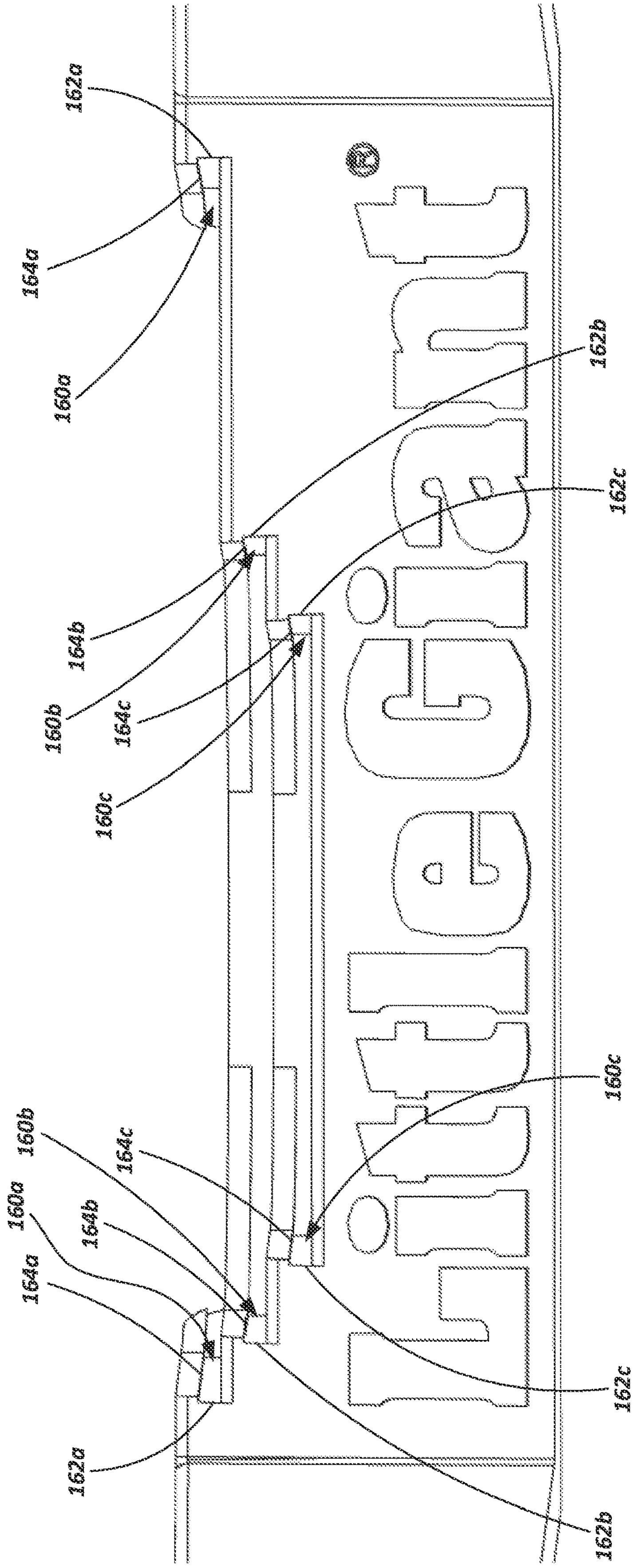
FIG. 10 is a detail view of a portion of the top cap shown in FIG. 3 as viewed from the front side of the top cap.
Figure 11:
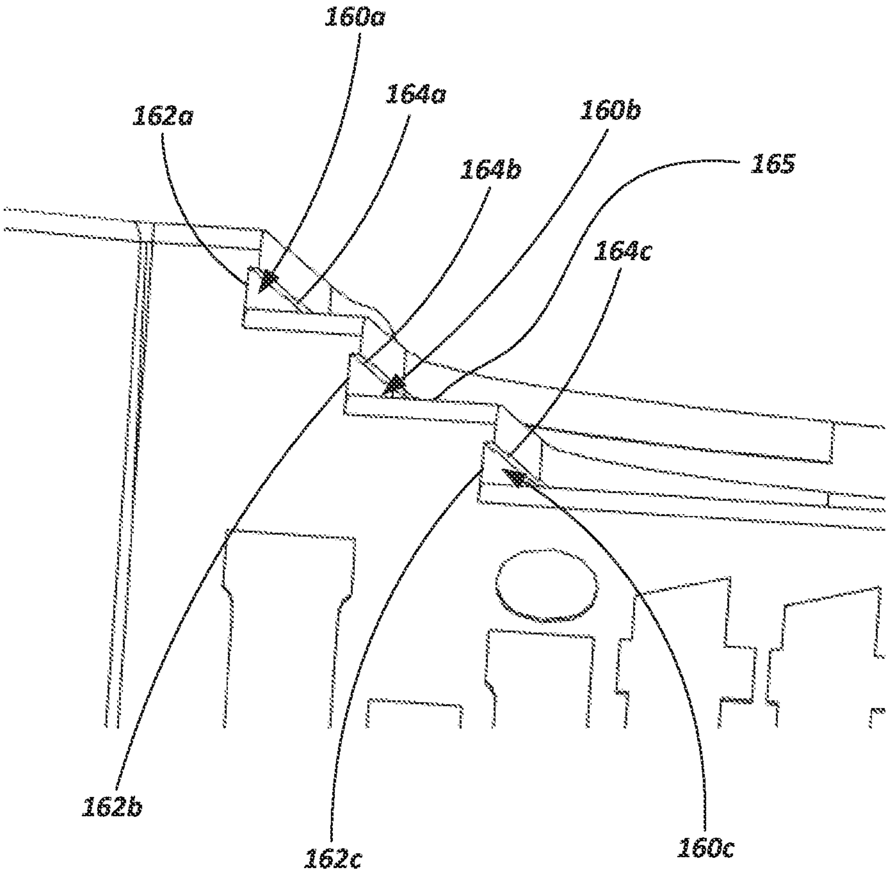
FIG. 11 is a perspective view of an enlarged detail of the top cap shown in FIG. 3.

As seen in FIGS. 4 and 8, a container or canister may be coupled with the top cap 116 using one of the retaining structures. For example a paint can 170 may include a lower lip 172 that laterally slides (e.g., from the front side of the top cap 116 in a direction toward the rear of the tap cap 116) into the lateral groove formed by the sidewall 162*a* and associated lip or shoulder 164*a*, thereby coupling the paint can 170 to the top cap 116. In some embodiments, the angled configuration of retaining structure 160*a* enables the paint can 170 to be wedged between the sidewall segments, creating an interference fit in addition to capturing the lower lip 170 within the sidewall groove. Additionally, the sidewall 160*a* can include a first portion that is substantially straight and a second portion that is curved or angled relative to the first portion. The lip or shoulder on the sidewall can also include adjacent straight and curved or angled segments. As shown, for example, in FIG. 7, a portion of the sidewall 162*a* near the front of the top cap 116 (i.e., at the bottom of the figure/the front face of the top cap and on the side including the side openings for retaining structures 160*b* and 160*c*) can be substantially straight and may transition to a slightly angled or curved portion near the opposite end of the sidewall 162*a* (i.e., at the rear face of the top cap). This enables a paint can 170 or other container to be stably secure on top of the top cap 116, even if the ladder were to be tipped slightly to one side or the other. The angled or curved portions of the sidewalls 162*a*, 162*b*, 162*c* also can help improve the wedging of a container and prevent the container from completely passing through the retaining structure 160*a*.

The retaining structures 160*a-c* may be configured to each accept a differently sized container. For example, the first retaining structure 160*a* may be configured to receive a gallon-sized paint can, the second retaining structure 160*b* may be configured to receive a quart-sized paint can, and the third retaining structure 160*c* may be configured to receive a pint-sized paint can. Of course, other sizes may be accommodated as may be desired. A first or top retaining structure 160*a* can have an open end at the front face of the top cap and an open end at the rear face of the top cap, while the second and third retaining structures 160*b*, 160*c* can have open ends only at one of the front or rear faces. In the embodiment of FIG. 7, the second and third retaining structures 160*b*, 160*c* have openings at the front face of the top cap to facilitate insertion of the bottom of a can or container from the front side of the ladder (i.e., the side facing the user as he or she climbs the rungs in a typical use case). The top or highest retaining structure 160*a* can have an open end at the rear face of the top cap to permit reception and securement (via the lip or shoulder) of cans or containers that are large enough to overhang the rear face of the top cap while being secured by the retaining structure 160*a*.

While the embodiment shown in FIGS. 3-11 depict retaining structures formed of sidewalls and overhanging lips or shoulder portions, in other embodiments, the retaining structures may be formed differently or exhibit different configurations. For example, in one embodiment, the retaining structures may comprising sidewalls that extend upwards from the floor (e.g., sidewall 164*b* extending from floor 165) so as to form an acute angle therebetween. Thus, the retaining structure may form a generally v-shaped groove (e.g., such as when viewed in profile) instead of the generally C-shaped profile shown in FIGS. 3-11. Such a profile would still capture and retain a lip or other feature of a paint can or similar container to hold it stably. In other embodiments, the retaining structures may be formed as a lateral groove exhibiting an arcuate cross-sectional profile.

The top cap 116 may be formed from a variety of materials using a variety of manufacturing techniques. In one embodiment, the top cap 116 may be formed as a unitary, homogenous member from a material such as plastic using an appropriate molding process. In other embodiments, the top cap 116 either as a unitary member or from multiple, individual components from any of a variety of materials including, for example, plastics, metals, composites or combinations thereof.

While the retaining structures 160*a-c* have been described as being associated with a top cap 116, they may alternatively, or additionally, be formed in or otherwise associated with the tray 122 such that when the tray 122 is in a desired position relative to the top cap 116 or the associated rails (e.g., 104), a container or canister may be stably coupled with and supported by the tray 122.

Figure 12:
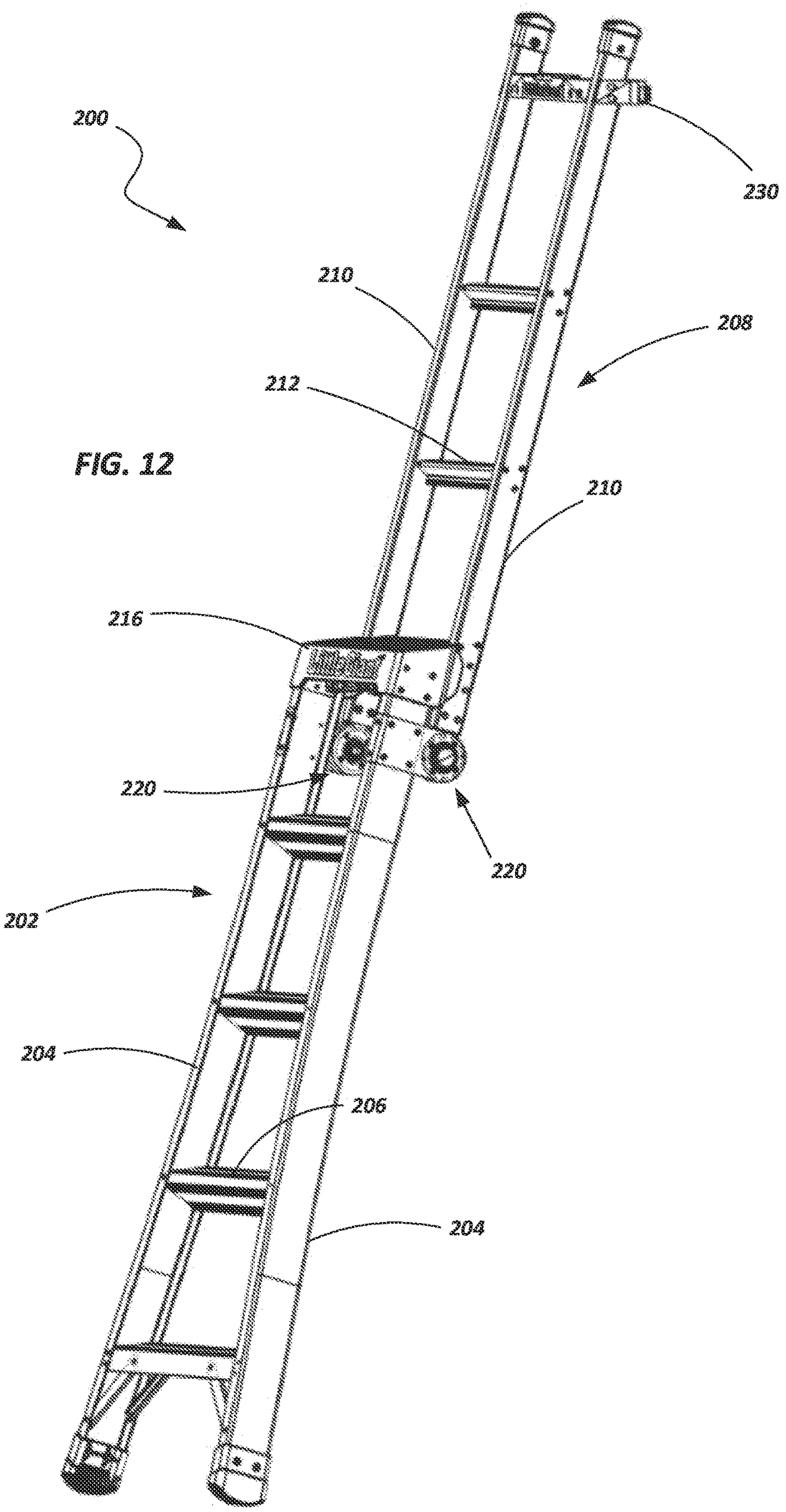
FIG. 12 is a perspective view of a ladder with an attached accessory according to an embodiment of the present disclosure.

Further, the retaining structures may be formed in or associated with another accessory, including a removable or detachable accessory. For example, FIG. 12 shows a perspective view of a ladder 200 comprising a first assembly 202 having a pair of spaced apart rails 204 and a plurality of rungs 206 extending between and coupled to the rails 204. For purposes of convenience, the rungs 206 and rails 204 of the first assembly 202.

The rungs 206 are spaced apart, substantially parallel to one another, and are configured to be substantially level when the ladder 200 is in an orientation of intended use so that the rungs 206 may be used as "steps" for a user to ascend the ladder 200 as will be appreciated by those of ordinary skill in the art. In various embodiments, the upper surface of the rungs 206 may include traction features (e.g., grooves and ridges, grip tape or other anti-slip features) to provide traction to a user while standing on the rungs 206.

The ladder 200 also includes a second assembly 208 having a pair of spaced apart rails 210. A plurality of rungs 212 extend between and are coupled to the spaced apart rails 210. The rungs 116 of the second assembly 208 are spaced apart, substantially parallel to one another, and are configured to be substantially level when the ladder 200 is in an orientation for intended use so that the rungs 212 may be used as "steps" for a user to ascend the ladder 200. In various embodiments, both top and bottom surfaces of the rungs 212 may include traction features (e.g., grooves and ridges, grip tape or other anti-slip features) to provide traction to a user while standing on the rungs 212.

A top cap 216 may be coupled with the upper portions of the rails 204 of the first assembly and configured to support the weight of a user in the event that a user stands on the top cap 216. The upper surface of the top cap 216 may also include traction or anti-slip features to provide traction to a user while standing thereon.

The second assembly 208 is pivotally coupled with the first assembly 202 via a pair of hinge assemblies 220 (sometimes referred to as "hinges" herein for purposes of brevity). In the embodiment shown, the hinges 220 are spaced away from the top cap 216 along the length of the front rails 204 of the first assembly 202. The hinges 220 may be configured to selectively lock the first assembly 202 and the second assembly 208 in one or more desired positions relative to each other. Thus, for example, in FIG. 12, the first and second assemblies 202 and 208 are locked such that the rails 210 of the second assembly 208 extend at an angle of substantially 180 degrees from the front rails 204. Stated another way, the front rails 204 and rear rails 210 extend from each other in a generally parallel manner with a significant portion of the second assembly 208 extending upwards and beyond the top cap 216. This configuration, which may be considered a straight ladder configuration, provides a user with the ability to reach extended heights (beyond that of the step ladder configuration) when the ladder 200 is leaned against an appropriate support surface (e.g., a wall or the edge of a roof).

The hinges 220 also enable the second assembly 208 to selectively rotate relative to the first assembly 202 such that the rear rails 210 may be positioned (and locked) to extend at an acute angle relative to the front rails 204, placing the ladder in a step ladder configuration. In yet another configuration, the hinges 220 enable the second assembly 208 to selectively rotate relative to the first assembly 202 such that the rear rails 210 may be positioned (and locked) to extend downwardly—away from the top cap 216—with the rails 202 and 210 of each assembly being positioned immediately adjacent each other, placing the ladder in a collapsed, stored condition. Various other details and examples associated with such a ladder are described in U.S. Patent Application Publication No. US2019/0376341, published on Dec. 12, 2019, the disclosure of which is incorporated by reference herein in its entirety.

The ladder 200 further includes an accessory 230 coupled with the rails 210 of the second assembly 208. In one embodiment, The accessory 230 may include a pair of recesses or notches formed in the body thereof for receipt of, and connection to, a pair of ladder rails (e.g., ladder rails 210 of the second assembly 208) for coupling the accessory 230 to a ladder. In some embodiments, the accessory 230 may be removably coupled with the rails 210 of the second assembly 208 (using a removable screw, bolt, or a latching device) and then be used or removed as desired by a user of the ladder. In some cases, the accessory 230 may be positioned adjacent a rung 212 or even take place of such a rung and be effectively fixed to the rails 210 of the second assembly 208 such that a user could not easily remove the accessory 230 in a nondestructive manner (e.g., such as by drilling through rivets or other fasteners or by destroying an adhesive or material bond between the accessory and the rails). Thus, when the ladder 200 is in a step ladder configuration or a stored configuration, the accessory 230 is positioned toward the "bottom" of the second assembly 208. Additionally, the accessory 230 is sized, shaped and positioned such that it does not cause interference between the second assembly 208 and the first assembly 202 when placed in the stored state. In one embodiment, the accessory 230 may include one or more retaining structures, similar to those described above (e.g., retaining structures 160*a-c*), configured to securely and stably hold a canister, such as a paint can or similar structure, on its top or bottom surface.

While the invention may be susceptible to various modifications and alternative forms, specific embodiments have been shown by way of example in the drawings and have been described in detail herein. However, it should be understood that the invention is not intended to be limited to the particular forms disclosed. Additionally, features of one embodiment may be combined with features of other embodiments without limitation. The invention includes all modifications, equivalents, and alternatives falling within the spirit and scope of the invention as defined by the following appended claims.

What is claimed is:

1. A ladder comprising:

a first pair of spaced apart rails;

at least one rung extending between and coupled with the first pair of spaced apart rails;

a second pair of spaced apart rails; and a top cap coupled with at least one of the first pair of spaced apart rails and the second pair of spaced apart rails, wherein the top cap includes a retaining structure, the retaining structure including a first sidewall extending from a floor portion and a first lip adjacent the first sidewall, the first lip extending in a cantilevered fashion over the first sidewall and over the floor portion.

2. The ladder of claim 1, wherein the retaining structure includes a second sidewall extending from the floor portion and a second lip adjacent the second sidewall.

3. The ladder of claim 2, wherein the first sidewall is spaced from the second sidewall to define an angle between approximately 8 degrees and approximately 12 degrees.

4. The ladder of claim 2, wherein the first sidewall is spaced from the second sidewall to define an angle of approximately 10 degrees.

5. The ladder of claim 2, wherein the first sidewall and the second sidewall are spaced to receive a cylindrical canister therebetween.

6. The ladder of claim 2, wherein the first sidewall and the second sidewall are spaced to receive a cylindrical canister having a volume of approximately one gallon.

7. The ladder of claim 1, wherein the first sidewall includes a first section and a second section, the first section and the second section being joined by an arcuate section.

8. The ladder of claim 7, wherein the first lip is positioned adjacent the first section and wherein a second lip is positioned adjacent the second section.

9. The ladder of claim 1, further comprising a second retaining structure including a second sidewall extending from a second floor portion and a second lip adjacent the second sidewall.

10. The ladder of claim 9, further comprising a third retaining structure including a third sidewall extending from a third floor portion and a third lip adjacent the third sidewall.

11. The ladder of claim 10, wherein:

the retaining structure is a first retaining structure, and the first retaining structure is sized and configured to retain a substantially cylindrical canister having a volume of approximately one gallon;

the second retaining structure is sized and configured to retain a substantially cylindrical canister having a volume of approximately one quart; and the third retaining structure is sized and configured to retain a substantially cylindrical canister having a volume of approximately one pint.

12. The ladder of claim 1, wherein the first sidewall includes a first portion and a second portion, the first portion being substantially straight, the second portion being curved or angled relative to the first portion.

13. The ladder of claim 1, wherein the top cap includes at least one opening formed in a front face of the top cap.

14. The ladder of claim 1, further comprising a pair of hinges coupling the second pair of spaced apart rails with the first pair of spaced apart rails.

15. The ladder of claim 13, wherein the top cap does not contact the second pair of spaced apart rails.

16. A top cap for a ladder, the top cap comprising:

a body being sized and configured for coupling with a pair of spaced apart rails; and a retaining structure formed in the body, the retaining structure including a first sidewall extending from a floor portion and a first lip adjacent to the first sidewall, wherein a lateral groove is defined by the first sidewall, the first lip, and the floor portion.

17. The top cap of claim 16, wherein the body is further sized and configured for coupling with an adjustable tray.

18. The top cap of claim 16, wherein the retaining structure includes a second sidewall extending from the floor portion and a second lip adjacent the second sidewall.

19. The top cap of claim 18, wherein the first sidewall is spaced from the second sidewall to define an angle between approximately 8 degrees and approximately 12 degrees.

20. The top cap of claim 18, wherein the first sidewall is spaced from the second sidewall to define an angle of approximately 10 degrees.

21. The top cap of claim 16, wherein the first sidewall includes a first section and a second section, the first section and the second section being joined by an arcuate section.

22. The top cap of claim 21, wherein the first lip is positioned adjacent the first section and wherein a second lip is positioned adjacent the second section.

23. The top cap of claim 16, further comprising a second retaining structure including a second sidewall extending from a second floor portion and a second lip adjacent the second sidewall.

24. The top cap of claim 23, further comprising a third retaining structure including a third sidewall extending from a third floor portion and a third lip adjacent the third sidewall.

25. The top cap of claim 24, wherein:

the retaining structure is a first retaining structure, and the first retaining structure is sized and configured to retain a substantially cylindrical canister having a volume of approximately one gallon;

the second retaining structure is sized and configured to retain a substantially cylindrical canister having a volume of approximately one quart; and the third retaining structure is sized and configured to retain a substantially cylindrical canister having a volume of approximately one pint.

26. The top cap of claim 16, wherein the top cap includes at least one storage compartment.

27. The top cap of claim 16, wherein the top cap includes a second retaining structure including a second sidewall extending downward from the floor portion, the second sidewall including a second shoulder extending horizontally from the second sidewall.

* * * * *